(12) United States Patent
Apsangi

(10) Patent No.: US 10,677,487 B2
(45) Date of Patent: Jun. 9, 2020

(54) PREDICTIVE HVAC SYSTEM CONTROLLING APPARATUS AND METHOD

(71) Applicant: Sandeep Apsangi, Houston, TX (US)

(72) Inventor: Sandeep Apsangi, Houston, TX (US)

(*) Notice: Subject to any disclaimer, the term of this patent is extended or adjusted under 35 U.S.C. 154(b) by 252 days.

(21) Appl. No.: 15/834,058

(22) Filed: Dec. 7, 2017

(65) Prior Publication Data

US 2019/0178520 A1  Jun. 13, 2019

(51) Int. Cl.
| | |
|---|---|
| *F24F 11/49* | (2018.01) |
| *F24F 11/38* | (2018.01) |
| *F24F 11/63* | (2018.01) |
| *G05B 13/02* | (2006.01) |
| *F24F 11/56* | (2018.01) |
| *F24F 11/52* | (2018.01) |
| *F24F 140/60* | (2018.01) |
| *F24F 140/12* | (2018.01) |
| *F24F 140/20* | (2018.01) |

(52) U.S. Cl.
CPC .............. *F24F 11/49* (2018.01); *F24F 11/38* (2018.01); *F24F 11/56* (2018.01); *F24F 11/63* (2018.01); *G05B 13/026* (2013.01); *F24F 11/52* (2018.01); *F24F 2140/12* (2018.01); *F24F 2140/20* (2018.01); *F24F 2140/60* (2018.01); *F25B 2700/13* (2013.01); *F25B 2700/15* (2013.01); *F25B 2700/19* (2013.01); *F25B 2700/2115* (2013.01)

(58) Field of Classification Search
CPC .. F24F 11/49; F24F 11/63; F24F 11/38; F24F 2140/20; F24F 2140/12; F24F 2140/60; F24F 11/52; F24F 11/56; G05B 13/026; F25B 2700/13; F25B 2700/2115; F25B 2700/19; F25B 2700/15
See application file for complete search history.

(56) References Cited

U.S. PATENT DOCUMENTS

| | | | |
|---|---|---|---|
| 2004/0165986 A1* | 8/2004 | Parker | F04D 29/164 415/220 |
| 2012/0111030 A1* | 5/2012 | Fraser | F25B 49/027 62/56 |
| 2016/0061507 A1* | 3/2016 | Penn, II | H02P 29/024 |
| 2016/0215996 A1* | 7/2016 | Blair | G08B 21/187 |
| 2017/0167744 A1* | 6/2017 | Arensmeier | F04D 25/06 |
| 2018/0031288 A1* | 2/2018 | Hern | F25B 41/062 |
| 2018/0032969 A1* | 2/2018 | Gillette | F24F 11/89 |
| 2019/0301780 A1* | 10/2019 | Schmidt | F25B 41/062 |

* cited by examiner

*Primary Examiner* — Thomas C Lee
*Assistant Examiner* — Charles Cai
(74) *Attorney, Agent, or Firm* — Rusha Jayasuriya

(57) ABSTRACT

A predictive HVAC control apparatus and method, the predictive HVAC control apparatus having an input/output interface connected to a gain amplifier and a thermocouple amplifier, the gain amplifier connected to a first plurality of sensors disposed on an HVAC system, the HVAC system having HVAC system controls, and the temperature amplifier connected to a second plurality of sensors disposed on an HVAC system, a central processing unit connected to the input/output interface, and an HVAC control relay, connected to the input/output interface and the HVAC system controls.

7 Claims, 8 Drawing Sheets

PREDICTIVE HVAC SYSTEM CONTROLLING APPARATUS AND METHOD

FIELD OF THE INVENTION

The present invention relates to HVAC systems, in particular, a predictive HVAC control apparatus to measure, compute, evaluate, and communicate HVAC system parameters, predict a future system failure, and proactively prevent system issues by taking control of the HVAC system.

BACKGROUND INFORMATION

Heating, ventilation, and air conditioning (HVAC) systems are standard components of modern homes and businesses. Responsible for providing comfortable ambient temperatures and good air quality, HVAC systems are one of the most critical aspects of a property and one of the most expensive to repair or replace. HVAC systems additionally provide adequate ventilation between areas of a house, filter air circulating within a home, and maintain pressure relationships between individual spaces. For those who live in areas with extreme weather conditions, it is particularly imperative to have a constantly functioning HVAC system. For example, during periods of continuous hot weather a broken HVAC unit can contribute to incidences of hyperthermia, especially in older adults and young children.

Once an HVAC system is installed, a prudent end user ensures that is it inspected at least annually to ensure that the system is functioning properly. This however is not often the case. These inspections require time, money, and diligence resulting in many end users failing to check their HVAC system after it has been installed. Furthermore a typical end user does not have the knowledge base or the tools required to perform even basic maintenance on an HVAC system on their own. Because most end users do not regularly maintain their HVAC systems, when an issue does arise it is often after the HVAC system breaks down. Even when an end user has been responsible about getting bi-annual maintenance checks, these inspections are simple usually involving checking the system charge, air filter, line pressures, condensate drains, controls, visually checking connections, and a rudimentary inspection of the evaporator and condenser coils. Some problems may be found and the life of the system may be assessed however, these maintenance checks cannot predict specific times when the HVAC system will incur an issue.

When residential HVAC systems incur problems or break down, it can take a while for a repairperson to come out to investigate and fix the issue. Service calls to HVAC service professionals can be costly and time intensive. Often, if a problem occurs during the weekend, an end user may have to wait up to 72 hours or more for a repairperson to investigate a broken HVAC system. This can be hazardous to the end user if the system goes down during a heat wave or during a period of extremely cold weather. The elderly and very young children are particularly susceptible to heat stroke and hypothermia because they cannot regulate their body temperatures as well as adults. Therefore, a nonfunctioning HVAC system can be dangerous to end users and any delay in its repair increases the likelihood of harm falling upon the residents. Additionally, during especially busy times, there may be a long line of customers having issues with their HVAC systems causing delays in having broken systems investigated putting the elderly and young children in even greater danger.

Most residential and commercial HVAC systems are mass-produced with capacity to match heating and cooling load as the most distinguishing factor between different units within a single brand. Generally, current residential or commercial systems have two major elements, an outdoor compressor/condensor unit and an indoor/evaporator unit, connected by refrigeration lines. An air conditioning system operates by taking warm air from the house, cooling it, and cycling it back through the house via a system of ducts. To cool the air, the collected warm air is blown across the indoor/evaporator unit, namely the evaporator coil. Refrigerant flows through the evaporator coil allowing the heat energy to transfer between the warm air and the refrigerant. By absorbing the heat from the warm air, the refrigerant transitions in state from a liquid to a gaseous vapor and the vapor is then pumped to the outdoor compressor/condenser unit. The vaporized refrigerant is compressed increasing the pressure and temperature of the vapor and then it moves through a condensing coil losing heat to the outdoors. This causes the vaporized refrigerant to cool and condense so that the refrigerant again transitions in state from a gaseous vapor back to a liquid. The liquid refrigerant then cycles back to the evaporator to start the process over again.

Generally, a home or building owner will not know if their HVAC system is incurring an issue until the problem has reached a critical stage and the system is down. Most residential and commercial HVAC systems are not equipped with the technology for real-time monitoring so the end user will not know the issue, just that the system is not functioning properly. Creating a system that comprehensively monitors HVAC systems in real-time would be cost-prohibitive to manufacturers due to the several expensive sensors and additional electronics that would need to be disposed within the entire system. It is therefore preferred to use as few sensors as possible to assess the functionality and efficiency of a system in order to monitor functionality. Current systems that are enabled with sensors merely provide information on ambient temperatures around the condenser, evaporator coils, and the dwelling. These systems do not provide clear information regarding the operating parameters, specifically, the parameters related to refrigerant pressures and temperatures, to fix the problems associated with the actual system operations. Furthermore, these systems fail to provide specific diagnostics to the end-user, repairpersons, or air conditioning contractors to direct attention towards a specific point of failure in order to efficiently troubleshoot the HVAC system. Additionally, monitoring an HVAC system in real-time fails to resolve the wait time for a service professional to repair a broken system even though the repair itself may take less time because the problem can be quickly identified. Rather, an HVAC system comprising few sensors to collect data and predictive HVAC control apparatus to monitor fundamental operating elements of the system, predictively assess an impeding system failure, and taking control of the HVAC system to prevent a possible system failure is preferred. Such a system would proactively shut down a failing HVAC system and allow a responsible party to contact a repairperson to investigate the potential problem thereby preventing a total system failure, minimizing the time required to fix the issue, and minimizing the cost by being able to rectify the problem before it exacerbates into larger expense such as a total system failure.

BRIEF DESCRIPTION OF THE DRAWINGS

These and other features and advantages of the present invention will be better understood by reading the following Detailed Description, taken together with the Drawings wherein.

DETAILED DESCRIPTION OF THE PREFERRED EMBODIMENTS

Figure 1:
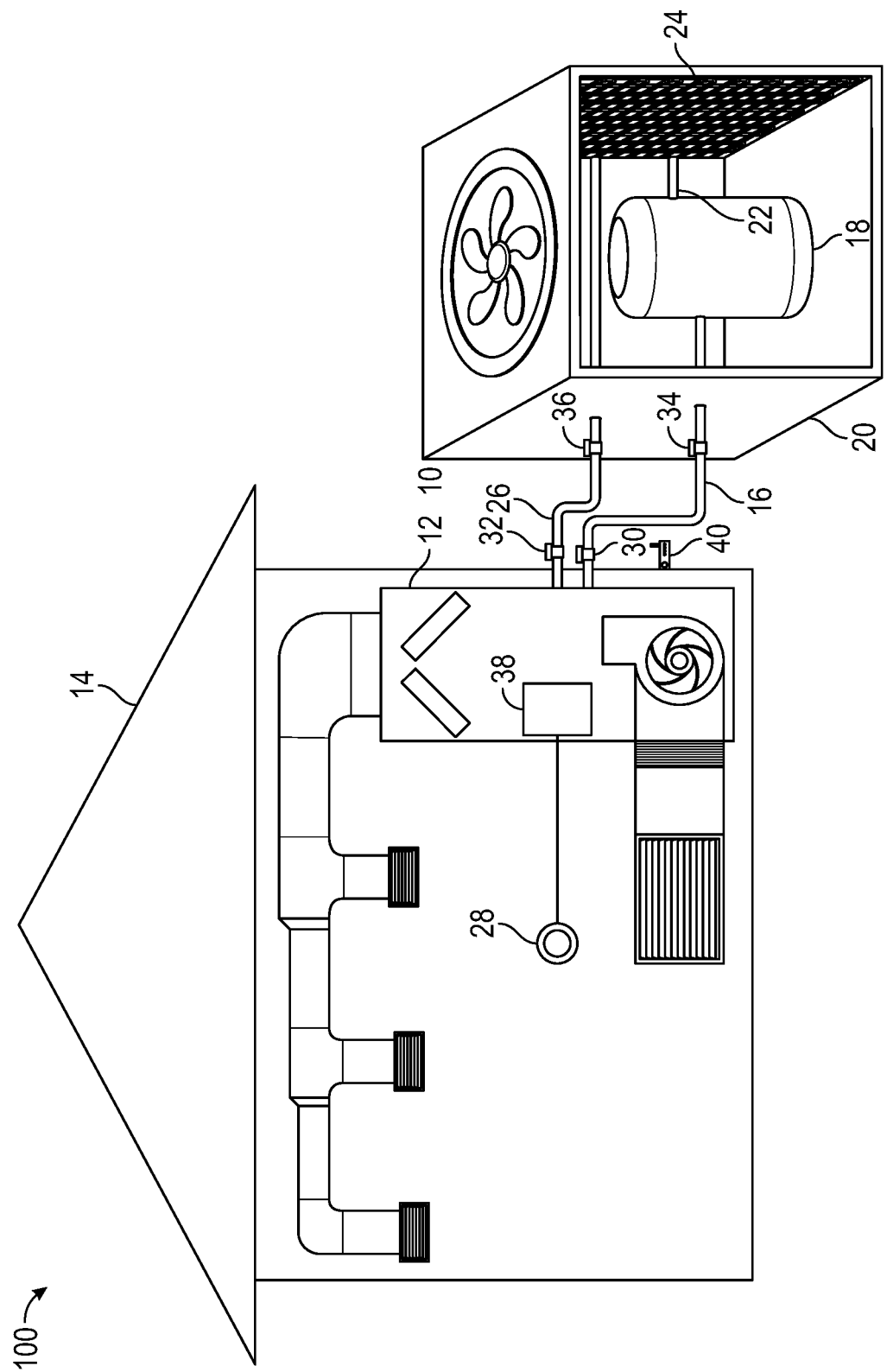
FIG. 1 shows a diagram of a system in accordance with one or more embodiments of the present invention installed on a generic HVAC system.

Specific embodiments of the invention will now be described in detail with reference to the accompanying figures. Like elements in the various figures are denoted by like reference numerals for consistency, simplicity, and clarity. The repetition of reference numerals does not in itself dictate a relationship between the various embodiments of the invention. In the following detailed description of embodiments of the invention, numerous specific details are set forth in order to provide a more thorough understanding of the invention. Specific examples of components and arrangements are described below to simplify the present disclosure. These are, of course, merely examples and are not intended to be limiting. However, it will be apparent to one of ordinary skill in the art that the invention may be practiced without these specific details to avoid unnecessary complicating the description.

Certain embodiments of the present disclosure are directed to an apparatus and method for a predictive HVAC equipment evaluation and control unit. A predictive HVAC controlling unit is configured to measure and assess refrigerant and air parameters, power consumption, predict and provide system maintenance and malfunction information, and take control of the HVAC system to avoid further damage. In certain embodiments, the predictive HVAC controlling unit is configured to receive operational data such as refrigerant and air functional characteristics from a plurality of sensors placed in an HVAC system. The predictive HVAC controlling unit is further configured to analyze operational data by amplifying, calibrating, and manipulating the received operational data, calculate performance metrics of the HVAC system, determine optimal efficiency performance metrics for the HVAC system, and take control of the HVAC system to shift current performance metrics of the HVAC system towards the optimal efficiency performance metrics.

The embodiment of FIG. 1 provides an embodiment of a predictive HVAC controlling unit 38 and sensor array, generally designated by reference numeral 10, installed on a generic HVAC system 100, according to the principles of the present invention. Predictive HVAC controlling unit 38 is connected, wired or wirelessly, to sensor array 10. Generic HVAC system 100 includes evaporating unit 12 generally located within interior of residence 14, vapor refrigerant line 16 connecting evaporating unit 12 to compressor 18 generally located outside of residence 14 and housed within outdoor HVAC unit 20, high pressure gas line 22 connecting compressor 18 to condensing unit 24, liquid refrigerant line 26 connecting condensing unit 24 to evaporating unit 12, and thermostat 28 configured to control HVAC system 100 and receive inputs from predictive HVAC controlling unit 38. In certain embodiments, generic HVAC system 100, predictive HVAC controlling unit 38, and sensor array 10 are installed in residence 14 however one knowledgeable in the art will appreciate that generic HVAC system 100, predictive HVAC controlling unit 38, and sensor array 10 may be installed on any type of HVAC system including but not limited to residential and commercial systems.

Refrigerant and air characteristics include temperature, pressure, power, airflow, and static pressure as measured by sensors 30, 32, 34, and 36 disposed throughout HVAC system 100 in a sensor array 10. Sensor array 10 includes sensors 30, 32, 34, and 36 disposed on refrigerant lines 16 and 26. Sensors 30, 32, 34, and 36 can each be any commercially available sensor enabled to gather pressure and temperature data of vapor or liquid refrigerant flowing through refrigerant lines 16 and 26. In certain embodiments of the invention, sensors 30, 32, 34, and 36 are wirelessly-enabled. One knowledgeable in the art will appreciate that any wireless technology may be enabled by sensors 30, 32, 34, and 36 including Bluetooth, Wi-fi, ZigBee, WIMAX, infrared, RFID, and any other wireless technology to communicate pressure and temperature data to predictive HVAC controlling unit 38. As shown in FIG. 1, the predictive HVAC controlling unit 38 is on-site. In certain embodiments, predictive HVAC controlling unit 38 is enabled to communicate with the sensors 30, 32, 34, and 36 wirelessly. In certain embodiments of the invention, sensors 30, 32, 34, and 36 are wired directly to predictive HVAC controlling unit 38.

In an embodiment of the invention, sensor 30 is a pressure sensor disposed on vapor refrigerant line 16 exiting from the evaporating unit 12 inside residence 14, sensor 32 is a pressure sensor disposed on liquid refrigerant line 26 entering into evaporating unit 12 inside residence 14, sensor 34 is a pressure and temperature sensor disposed on vapor refrigerant line 16 entering compressor 18 outside residence 14, and sensor 36 is a pressure and temperature sensor disposed on liquid refrigerant line 26 exiting from condensing unit 24 outside residence 14. In an alternate embodiment of the invention the temperature and pressure data gathered by sensor 34 may be performed by two sensors each tasked with gathering either temperature or pressure data. In an alternate embodiment of the invention the temperature and pressure data gathered by sensor 36 may be performed by two sensors each tasked with gathering either temperature or pressure data. In certain embodiments of the invention, sensors 30 and 32 additionally gather temperature data.

Figure 2:
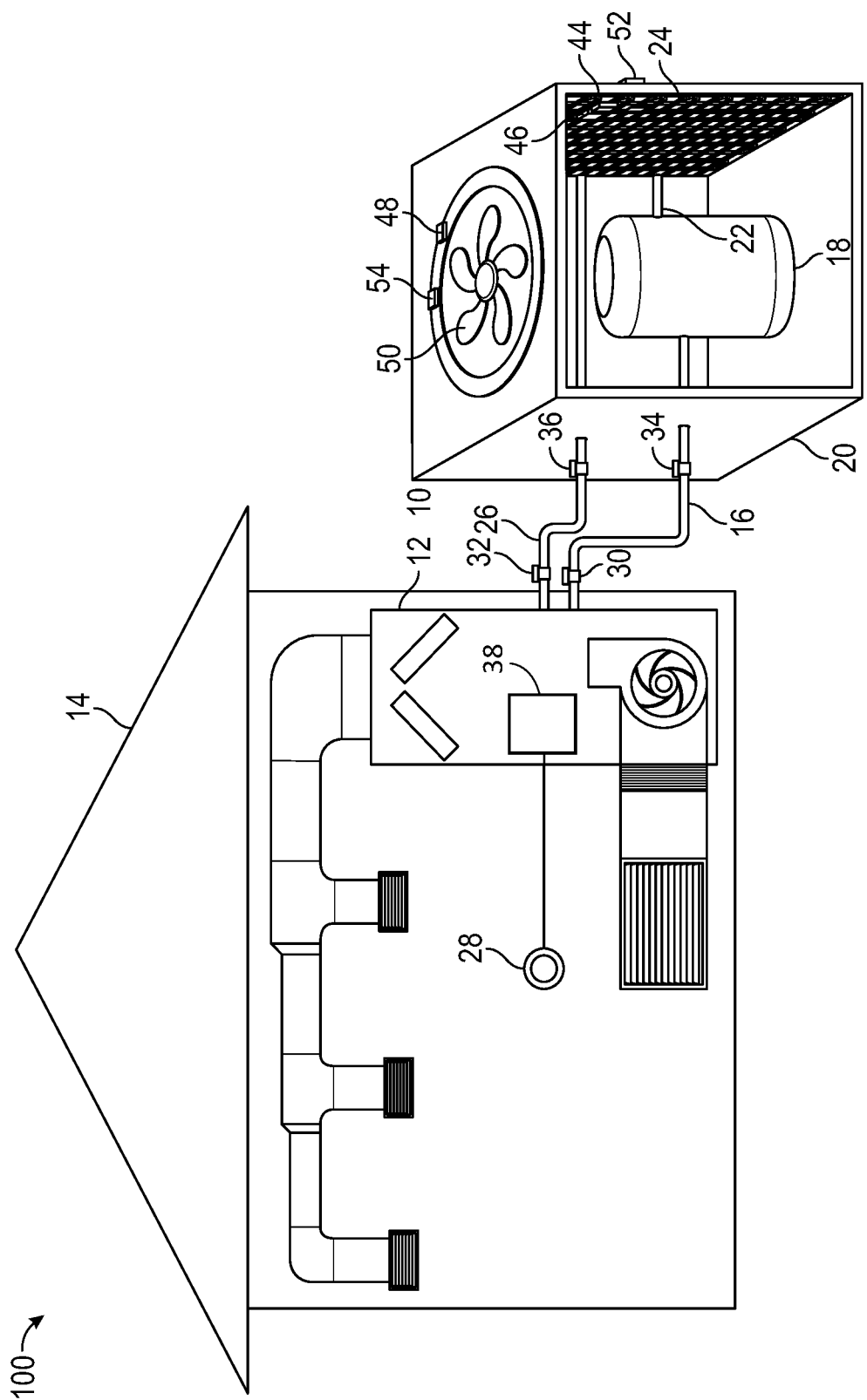
FIG. 2 shows a diagram of a system in accordance with one or more embodiments of the present invention installed on a generic HVAC system in accordance with an alternative embodiment of the present invention.

FIG. 2 depicts air inlet temperature sensor 44 positioned in the air stream of the external surface of outdoor HVAC unit 20 proximate to condensing unit 24 and adjacent to inlet vent 46. Air outlet temperature sensor 48 is positioned in the air stream of the outdoor HVAC unit 20 above condensing unit 24 and adjacent to outlet fan 50. In this embodiment of the invention, air inlet static pressure sensor 52 is disposed in the air stream around the outdoor HVAC unit 20 lateral to condensing unit 24 and adjacent to inlet vent 46 and air outlet static pressure sensor 54 is disposed on an external surface of outdoor HVAC unit 20 above condensing unit 24 and adjacent to outlet fan 50. Air inlet and air outlet static pressure sensors 52 and 54, respectively, can be any commercially available device for measuring static pressure including static pressure taps, static pressure fittings, static pressure tips, and static pressure tubes. In certain embodiments, sensor array 10 includes sensors 44, 48, 52, and 54.

Figure 3:
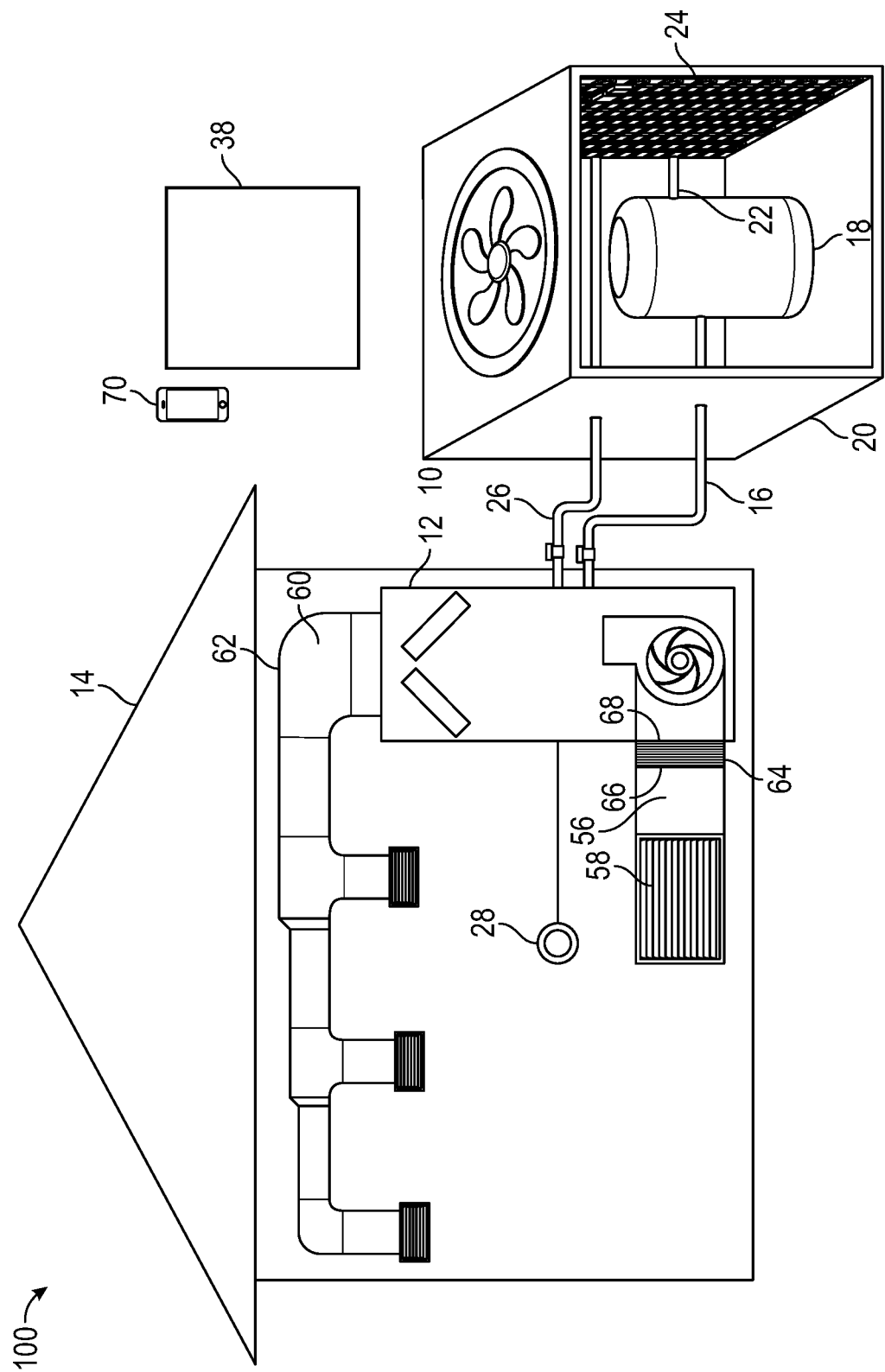
FIG. 3 shows a diagram of a system in accordance with one or more embodiments of the present invention installed on a generic HVAC system in accordance with another alternative embodiment of the present invention.

FIG. 3 depicts return air temperature sensor 56 and supply air temperature sensor 60 inside residence 14. In certain embodiments of the invention, return air temperature sensor 56 may be disposed in the air stream of the return air duct 58. In certain embodiments of the invention, supply air temperature sensor 60 may be positioned in the air stream of supply air duct 62. Filter 64 is placed between the return air duct 58 and evaporating unit 12. In certain embodiments of the invention, duct-side static pressure sensor 66 is disposed adjacent to a surface of the filter 64 facing return air duct 58 and unit-side static pressure sensor 68 is disposed adjacent to a surface of filter 64 facing evaporating unit 12. Duct-side and unit-side static pressure sensors 66 and 68, respectively, can be any commercially available device for measuring static pressure including static pressure taps, static pressure fittings, static pressure tips, and static pressure tubes. In certain embodiments, sensor array 10 includes sensors 56, 60, 66, and 68. In certain embodiments of the invention, predictive HVAC controlling unit 38 is off-site and is further configured to communicate with a mobile device 70. Mobile device 70 may be configured to receive refrigerant parameters, a potential HVAC system failure alert, and a HVAC control action alert from predictive HVAC controlling unit 38.

Figure 4:
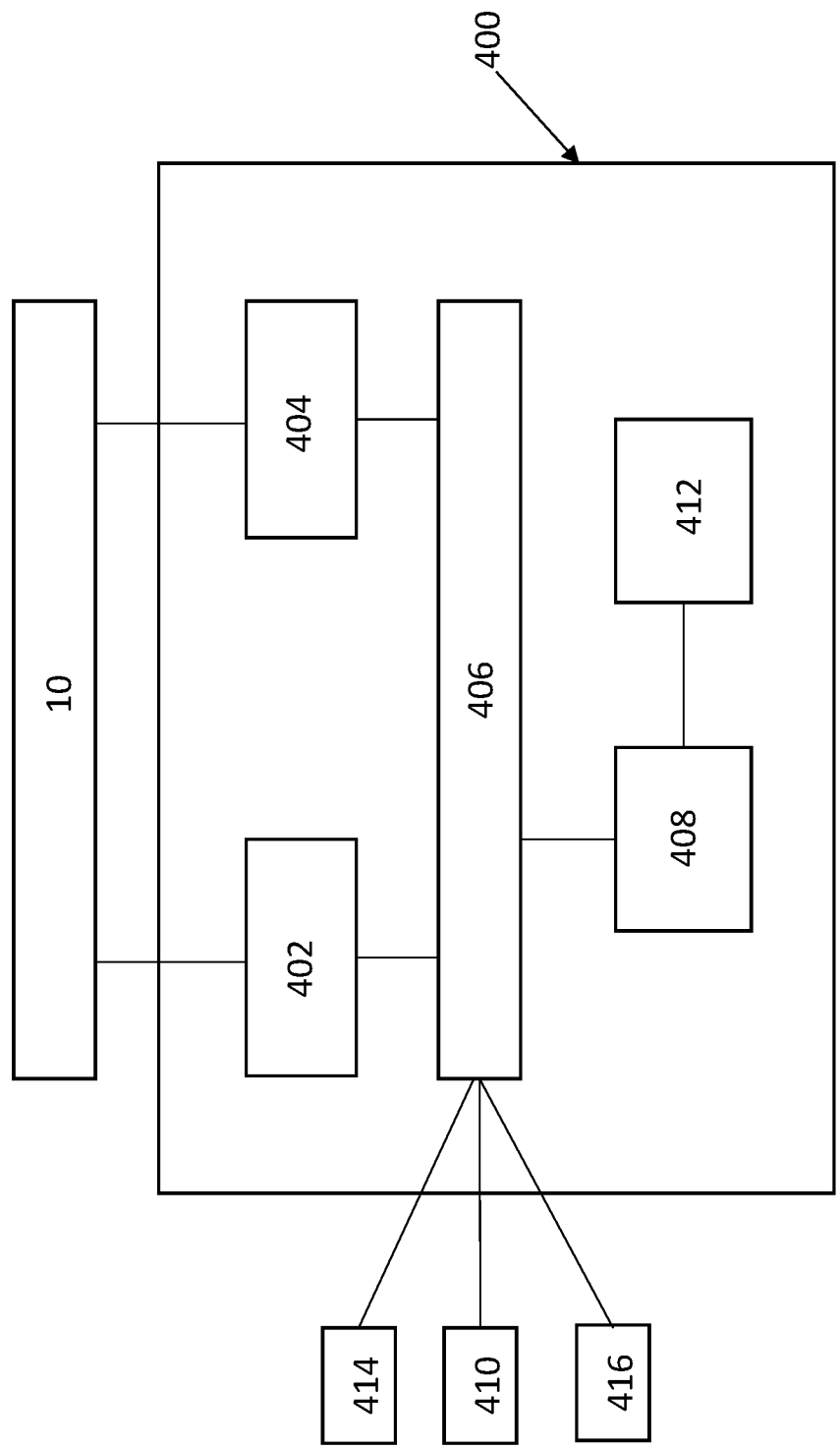
FIG. 4 shows a diagram of a predictive HVAC controlling unit in accordance with one or more embodiments of the present invention.

FIG. 4 shows a top-level internal view of the predictive HVAC controlling unit 38. Predictive HVAC controlling unit 38 is disposed in a housing 400. Gain amplifier 402 processes analog signals of the sensors and is coupled to an input/output interface 406. Gain amplifier 402 receives voltage measurements from sensor array 10 and converts the voltage measurements into gain-based digital values. Input/output interface 406 is also coupled to temperature amplifier 404 and central processing unit 408. Temperature amplifier 404 receives voltage measurements from sensor array 10 and converts the voltage measurements into digital temperature signals. In certain embodiments, gain amplifier 402 and temperature amplifier 404 are wirelessly connected to the input/output interface 406. In certain embodiments, input/output interface 406 is wirelessly-enabled and connected to a cloud-based server or mobile device 70. In one or more embodiments, input/output interface 406 and central processing unit 408 may be in a single-board computer. Memory 412 is coupled to the central processing unit 408. Memory 412 stores an operating system for central processing unit 408. In certain embodiments, memory 412 includes memory card, USB-based memory drive, or any digital storage device that may be coupled to central processing unit 408. The input/output interface 406 may be coupled to HVAC control relay 410. In certain embodiments, HVAC control relay 410 may be Wi-Fi or Bluetooth enabled. In certain embodiments, HVAC control relay 410 is connected directly to the HVAC system and may turn HVAC system 100 on and off. In certain embodiments, HVAC control relay 410 may increase or decrease HVAC system 100 load. In certain embodiments, input/output interface 406 is connected thermostat 28 to turn HVAC system 100 on and off. In certain embodiments, input/output interface 406 is connected to user display 414. In certain embodiments, input/output interface 406 is connected to cloud server 416.

In certain embodiments, predictive HVAC controlling unit 38 is configured to receive gain-based digital values and digital temperature signals from gain amplifier 402 and temperature amplifier 404, respectively. In certain embodiments, predictive HVAC controlling unit 38 is further configured to process gain-based digital values and digital temperature signals to determine optimal efficiency refrigerant parameters, analyze HVAC system 100 efficiency, predict system failure, output HVAC system 100 efficiency, and output control signals to HVAC control relay 410. In certain embodiments, HVAC control relay 410 inputs control signals and switches for high and low voltage devices and turns the system off and on based on the analysis of gain-based digital values and digital temperature signals and determination of optimal efficiency refrigerant parameters. In certain embodiments, HVAC control relay 410 varies HVAC system 100 speed, increasing or decreasing system load, based on modulating refrigerant parameters to stay within optimal efficiency parameters. In certain embodiments, gain amplifier 402, temperature amplifier 404, input/output interface 406, central processing unit 408, HVAC control relay 410, memory 412 and other required components may be combined into one board and serve as a HVAC controlling unit.

Predictive HVAC controlling unit 38 is configured to receive refrigerant and air characteristics data from the sensor array 10, convert analog signals of the refrigerant and air characteristics data to digital signals, amplify the digital signals, calibrate data, process the digital signals by calculating key system parameters, determine whether a potential failure modality exists or is eminent, take control of the HVAC system 100 to prevent system failure or shift the refrigerant parameters towards optimal efficiency. In some embodiments, the predictive HVAC controlling unit 38 may take control of the HVAC system 100 by turning the system on or off. In certain embodiments, predictive HVAC controlling unit 38 increases or decreases load on the HVAC system to shift the refrigerant parameters towards optimal efficiency. Predictive HVAC controlling unit 38 is further configured to communicate to an end user, operational parameters of the HVAC system 100 and a determination of a potential eminent failure modality. The user may be anyone who has responsibility for the maintenance of the building or is tasked with monitoring or maintaining the functionality of the building's HVAC system including but not limited to a building manager, building owner, leasor, leasee, end user, or a monitoring service.

Figure 5:
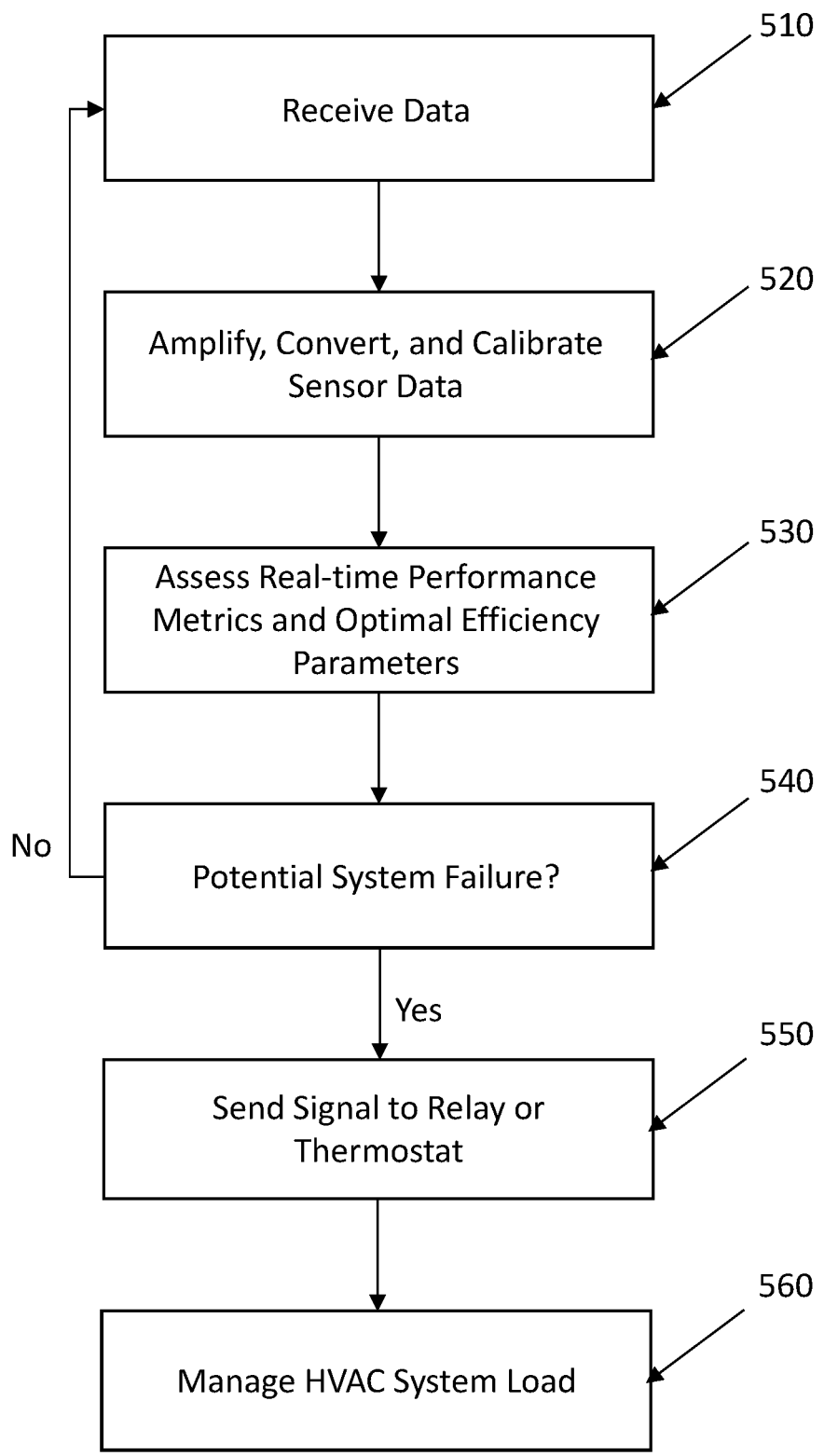
FIG. 5 shows a flowchart in accordance with an embodiment of the present invention.

FIG. 5 shows a flowchart in accordance with one or more embodiments of the present invention. Specifically, FIG. 5 shows a flowchart of a method for predicting an operational problem with an HVAC system, alerting a responsible party regarding the problem, and taking control of the HVAC system to prevent an HVAC system failure. In certain embodiments, one or more of the steps described with respect to FIG. 5 may not be performed, may be performed in a different order, and/or may be repeated. Accordingly, the specific arrangement of steps shown in FIG. 5 should not be construed as limiting the scope of the invention in any way.

At 510, predictive HVAC controlling unit 38 receives sensor data from sensor array 10. Sensors in sensor array 10 are disposed at key points in HVAC system 100 allowing for temperature, pressure, and static pressure measurements of refrigerant or air circulating in HVAC system 100. Different types of sensors are discussed above with respect to FIGS. 1, 2, and 3. Sensor data is received in analog with a measurement range of 0 to 100 millivolts. At 520, predictive HVAC controlling unit 38 converts, amplifies, and calibrates an analog measurement to digital signal. In certain embodiments, sensor data includes a plurality of analog signals that are amplified and converted to digital signals. In certain embodiments, temperature amplifier 404 amplifies temperature measurements in analog and converts temperature measurements in analog to digital temperature signals. In certain embodiments, gain amplifier 402 amplifies pressure measurements in analog and converts pressure measurements in analog to digital pressure signals. By way of example, in certain embodiments, sensor data includes two analog pressure measurements from a differential pressure transducer and each analog pressure measurement is converted at 520 to a digital signal. In such an embodiment, at 520, one digital signal may be subtracted from the other to determine a differential digital pressure signal. At 530, predictive HVAC controlling unit 38 assesses real-time performance metrics using the converted sensor data or temperature and pressure digital signals by calculating real-time performance metrics and ascertaining optimal efficiency parameters. In certain embodiments, temperature amplifier 404 sends temperature digital signals to input/output interface 406, gain amplifier 402 sends pressure digital signals to input/output interface 406, and input/output interface 406 sends temperature and pressure digital signals to central processing unit 408. In certain embodiments, central processing unit 408 of predictive HVAC controlling unit 38 calculates and evaluates real-time performance metrics using the converted sensor data or temperature and pressure digital signals. In certain embodiments, at 540, predictive HVAC controlling unit 38 compares real-time performance metrics to optimal efficiency parameters to determine a potential HVAC system 100 failure. In certain embodiments, central processing unit 408 of predictive HVAC controlling unit 38 compares real-time performance metrics to optimal efficiency parameters to determine a potential HVAC system 100 failure. In certain embodiments, the optimal efficiency parameter may be represented by one or more ranges of data, which when compared to the real-time performance metrics, indicate whether the HVAC system 100 is operating in a functional, dangerous, or critical manner. In certain embodiments, real-time performance metrics are reported to an end-user with indications of whether the real-time performance metrics are within functional, dangerous, or critical ranges. In certain embodiments, predictive HVAC controlling unit 38 compares real-time performance metrics to optimal efficiency parameters to determine how HVAC system 100 can run more efficiently. If no potential failure is determined at 540, predictive HVAC controlling unit 38 receives further sensor data 510. If at least one potential system failure is determined at 540, input/output interface 406 sends a signal to HVAC control relay 410 or thermostat 28, at 550, to manage HVAC system 100 load by shutting down, ramping up or down, or turning on HVAC system 100, at 560. In certain embodiments, predictive HVAC controlling unit 38 sends a signal to speed up or down HVAC system 100 so that HVAC system 100 runs more efficiently. In certain embodiments, predictive HVAC controlling unit 38 sends an alert message to end user informing end user of the at least one determined potential system failure from 540. In certain embodiments, the alert is sent to a monitoring service. The monitoring service may directly contact a repairperson to inspect the HVAC system and rectify any issues that may be apparent. In other embodiments, predictive HVAC controlling unit 38 directly contacts a preferred repairperson to inspect the HVAC system and rectify any issues that may be apparent.

Figure 6:
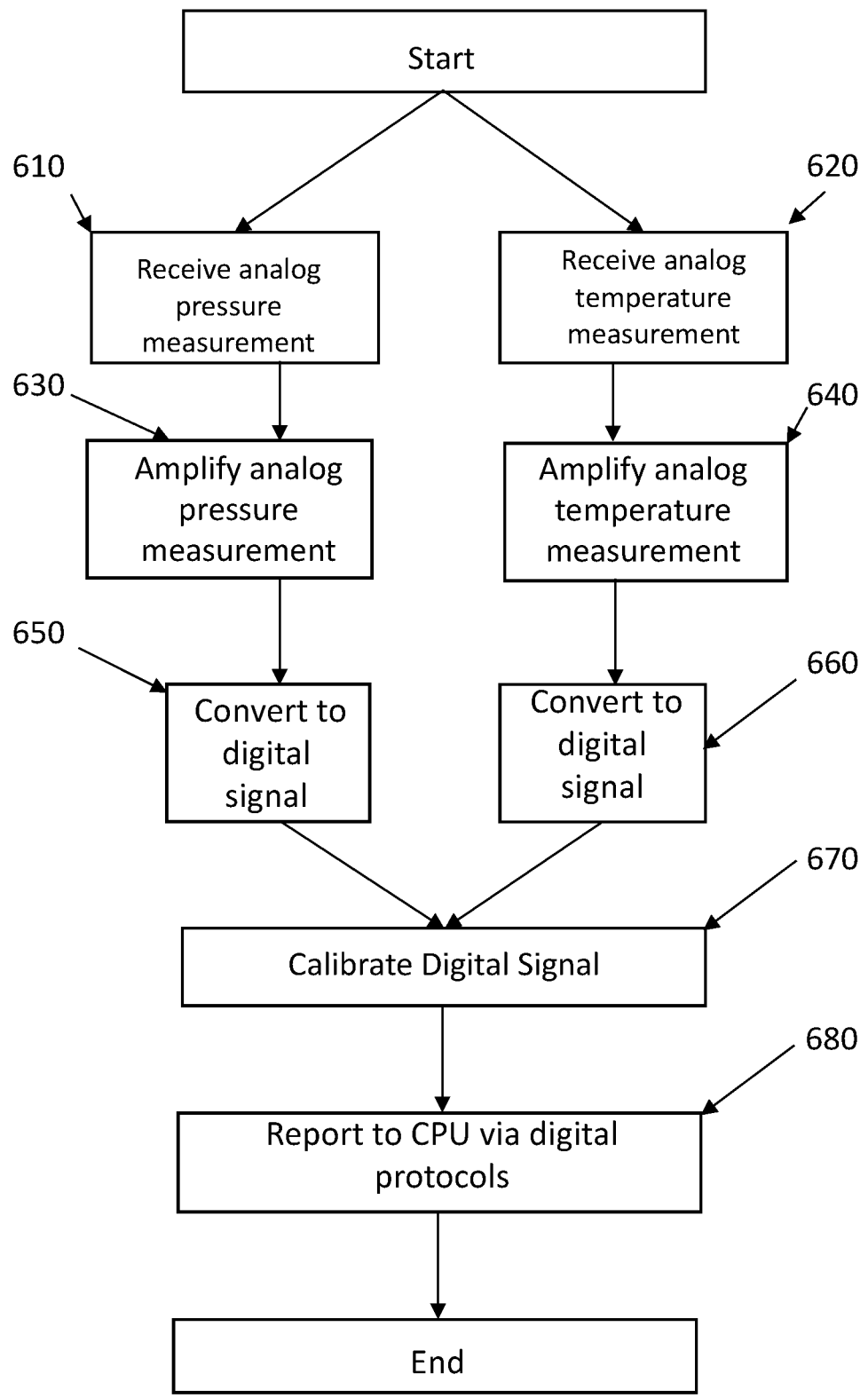
FIG. 6 shows a detailed flowchart in accordance with an embodiment of the present invention.

FIG. 6 shows a detailed flowchart of the steps as described in 520 of the present application in accordance with one or more embodiments of the present invention. By way of example, in certain embodiments at 610, sensor data including an analog pressure measurement of liquid vapor is received by gain amplifier 402 from a pressure sensor in sensor array 10. At 620, sensor data further includes an analog temperature measurement of liquid vapor received by temperature amplifier 404 from a temperature sensor in sensor array 10. Gain amplifier 402 amplifies analog pressure measurement at 630. Temperature amplifier 404 amplifies analog temperature measurement at 640. In certain embodiments, sensor data is amplified from millivolts to volts. In certain embodiments, sensor data is amplified to volts depending on a measurement range of the sensor data. At 650, amplified analog pressure measurement is converted from an analog measurement to a digital pressure signal having digital values by the gain amplifier 402. At 660, amplified analog temperature measurement is converted from an analog measurement to a digital temperature signal having digital values by the temperature amplifier 404. In certain embodiments, analog sensor data is converted to digital signals using a 16-bit amplifier. The type and level of amplification may be configured based on type of sensor data or application of sensor data. In certain embodiments, the amplified analog temperature measurement is mapped to a range of digital values that represents the digital temperature signal. At 670, digital pressure signal and digital temperature signal are calibrated. In certain embodiments, a pre-determined calibration ratio is used to calibrate the digital temperature signal. In certain embodiments, the pre-determined calibration ratio may be a ratio of a calibration reference temperature over a calibration digital temperature signal. The pre-determined calibration ratio may be configured prior to use of the predictive HVAC controlling unit 38. The digital pressure signal may be calibrated in a similar way using a calibration reference pressure. At 680, calibrated digital temperature signal and calibrated digital pressure signal are sent to central processing unit 408 using digital protocols through the input/output interface 406. Any commercially available wired and wireless digital protocols may be used.

Figure 7:
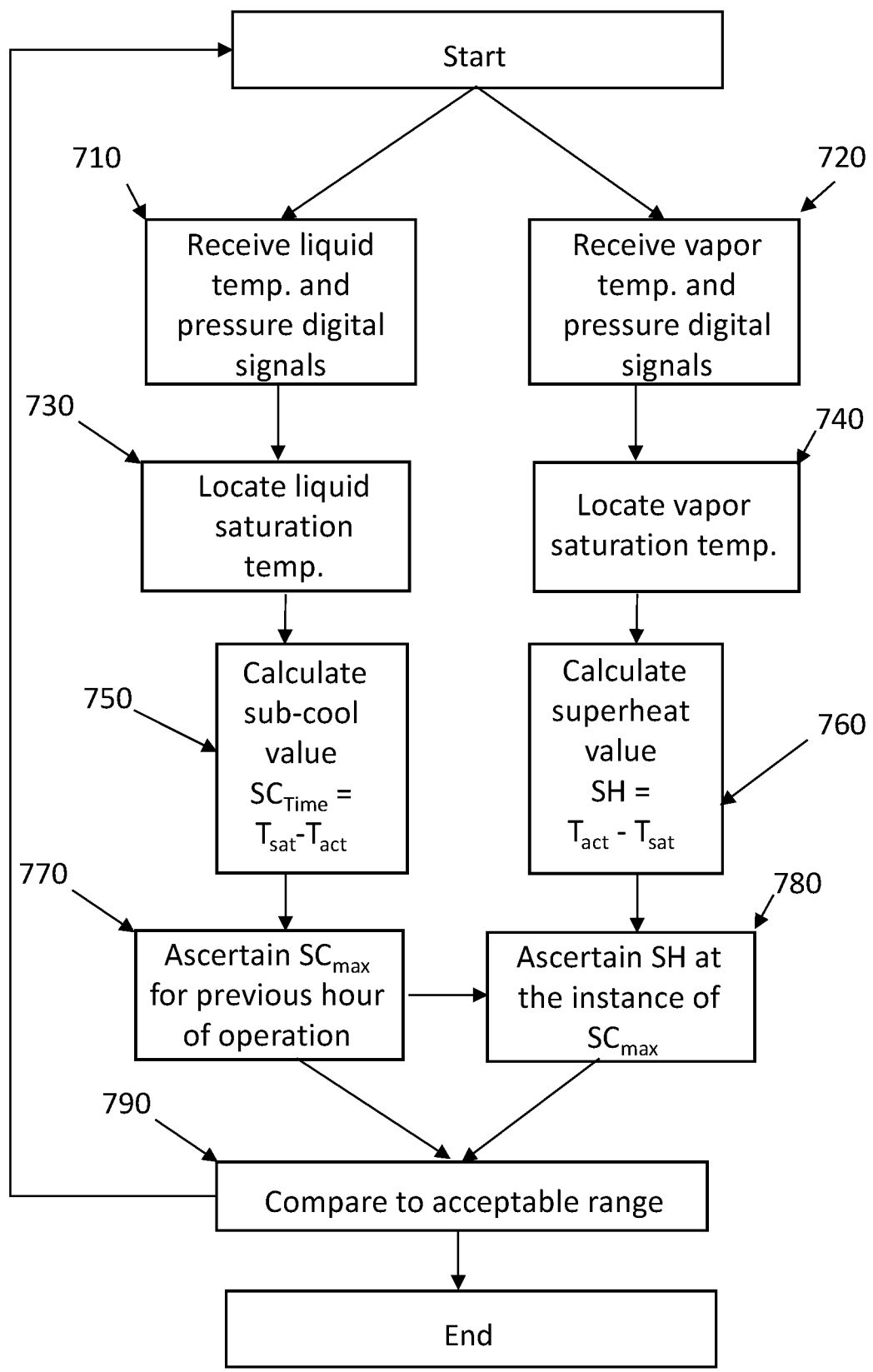
FIG. 7 shows a detailed flowchart in accordance with an embodiment of the present invention.

FIG. 7 shows a detailed flowchart of the steps as described in 530 of the present application in accordance with one or more embodiments of the present invention. In certain embodiments, real-time performance metrics and optimal efficiency parameters include capacity, communications and controls, charge level, electrical current, flow volume, mass flow rate, power, pressure, relative humidity, rotational speed, subcooling, superheat, temperature, flow velocity, and voltage. By way of example, FIG. 7 shows the assessment of subcooling and superheat real-time performance metrics by the predictive HVAC controlling unit 38. At 710, liquid temperature and pressure digital signals are received by central processing unit 408. At 720, central processing unit 408 receives vapor temperature and pressure digital signals. At 730, a liquid saturation temperature is located and ascertained. At 740, a vapor saturation temperature is located and ascertained. At 750, central processing unit 408 calculates subcooling for HVAC system 100 at a specific time as the difference of the liquid saturation temperature and the actual temperature derived from the liquid temperature digital signal. At 760, central processing unit 408 calculates superheat for HVAC system 100 at a specific time as difference of the actual temperature from the vapor temperature digital signal and the vapor saturation temperature. In certain embodiments, central processing unit sends subcooling values for a specific time to memory 412 to store for future use. At 770, central processing unit 408 ascertains a maximum subcooling value at a specific time from a prior hour of operation. At 780, central processing unit 408 ascertains a superheat value at the specific time of the maximum subcooling value. In certain embodiments, at 790 a temperature and pressure digital signals are reviewed to ensure that they are in acceptable ranges. In certain embodiments, the acceptable range may be above zero.

Figure 8:
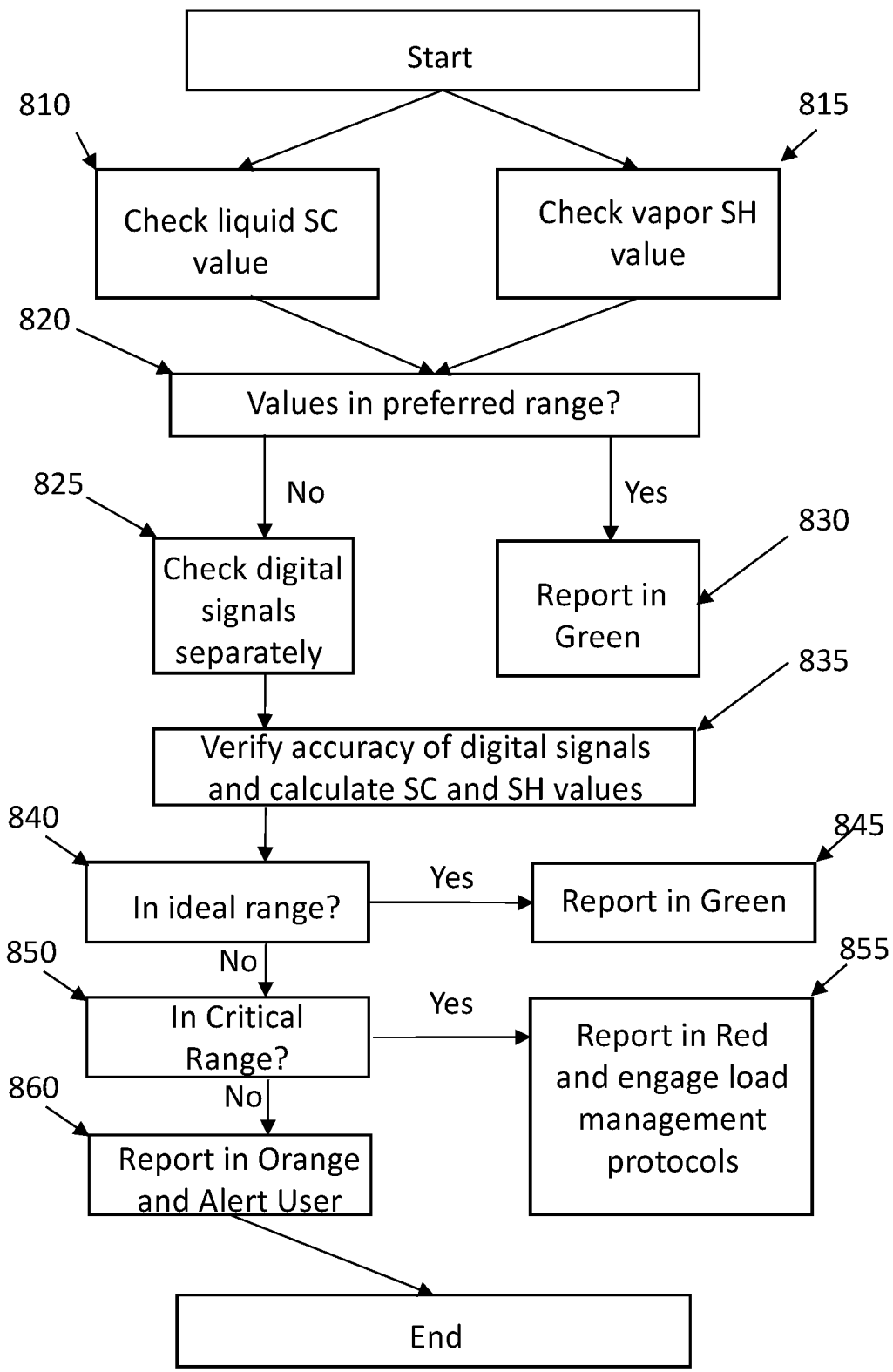
FIG. 8 shows a detailed flowchart in accordance with an embodiment of the present invention.

FIG. 8 shows a detailed flowchart of the steps as described in 540 of the present application in accordance with one or more embodiments of the present invention. By way of example, FIG. 7 shows the determination of whether a potential system is eminent based on liquid subcooling and vapor superheat values as determined in FIG. 7. At 810 the central processing unit 408 checks the liquid subcooling value. At 815, the central processing unit 408 checks the vapor superheat value. At 820, the central processing unit 408 determines whether the liquid subcooling or vapor superheat values are within a functioning or preferred range. If so, at 830, the liquid subcooling or vapor superheat values are reported to an end-user. If the liquid subcooling or vapor superheat values are not in a functioning or preferred range, at 825, the central processing unit 408 checks the temperature and pressure digital signals separately and independently. At 835 the central processing unit 408 verifies the accuracy of the temperature and pressure digital signals and calculates the subcooling and superheat values based on the verified temperature and pressure digital signals. At 840, the central processing unit 408 determines whether the subcooling and superheat values are within an ideal or functioning range and if so at 845, the subcooling and superheat values are reported to an end-user with an indication that subcooling and superheat values are in the ideal or functioning range. In certain embodiments, the indication of the values being in the ideal or functioning range is that the reported values are highlighted in green. If the subcooling and superheat values are not within an ideal or functioning range, the central processing unit 408 at 850 determines whether the subcooling and superheat values are within a critical range. If the subcooling and superheat values are within the critical range then an imminent HVAC system 100 failure or an indication of a failure modality has been determined and at 855, the subcooling and superheat values are reported to an end-user with an indication that subcooling and superheat values are in the critical range and the central processing unit 408 sends an instruction to the input/output interface 406 to send a signal to relay 410 based on load management protocols engaging load management protocols. In certain embodiments, the critical range represents a range of values that may indicate a system failure of the HVAC system 100. In certain embodiments, the indication of the values being in the critical range is that the reported values are highlighted in red. If the subcooling and superheat values are not within the critical range, at 860, the subcooling and superheat values are reported to an end-user with an indication that subcooling and superheat values are in a dangerous range. In certain embodiments, the indication of the values being in the dangerous range is that the reported values are highlighted in orange. In certain embodiments, when a real-time performance metric is in the dangerous range, load management protocols may be engaged. In certain embodiments, the functioning, dangerous, and critical ranges are user-defined. In certain embodiments, the alerts and reporting mechanisms to the end-user are user-defined. In certain embodiments, the HVAC system 100 load management protocols are user-defined.

While the principles of the invention have been described herein, it is to be understood by those skilled in the art that this description is made only by way of example and not as a limitation as to the scope of the invention. Further embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method for predictively controlling an HVAC system to prevent system malfunction comprising:
    sending sensor data gathered from an array of sensors disposed on the HVAC system;
    receiving said sensor data by at least one amplifier;
    amplifying said sensor data;
    converting said sensor data to a digital signal;
    calibrating said digital signal;
    calculating a real-time performance metric based on said digital signal;
    assessing the real-time performance metric based on an optimal efficiency parameter; and
    determining whether a potential system failure is imminent,
    wherein said real-time performance metric comprises capacity, communications and controls, charge level, electrical current, flow volume, mass flow rate, power, pressure, relative humidity, rotational speed, subcooling, superheat, temperature, flow velocity, and voltage.

2. The method for predictively controlling an HVAC system to prevent system malfunction of claim 1 further comprising sending a signal to a relay to manage HVAC system load.

3. The method for predictively controlling an HVAC system to prevent system malfunction of claim 1 further comprising reporting to an end user said real-time performance metric.

4. The method for predictively controlling an HVAC system to prevent system malfunction of claim 3 further comprising reporting to the end user an indication of whether said real-time performance metric is within a functional, dangerous, or critical range.

5. The method for predictively controlling an HVAC system to prevent system malfunction of claim 1 wherein said step of determining whether a potential system failure is imminent comprises comparing said real-time performance metric to said optimal efficiency parameter.

6. The method for predictively controlling an HVAC system to prevent system malfunction of claim 1 wherein said optimal efficiency parameter comprises a range of data indicating whether said HVAC system is operating in a functional, dangerous, or critical manner.

7. The method for predictively controlling an HVAC system to prevent system malfunction of claim 1 wherein said step of determining whether a potential system failure is imminent comprises comparing said real-time performance metric to said optimal efficiency parameter to determine how said HVAC system can run more efficiently.

* * * * *